Figures 1, 2, 3:
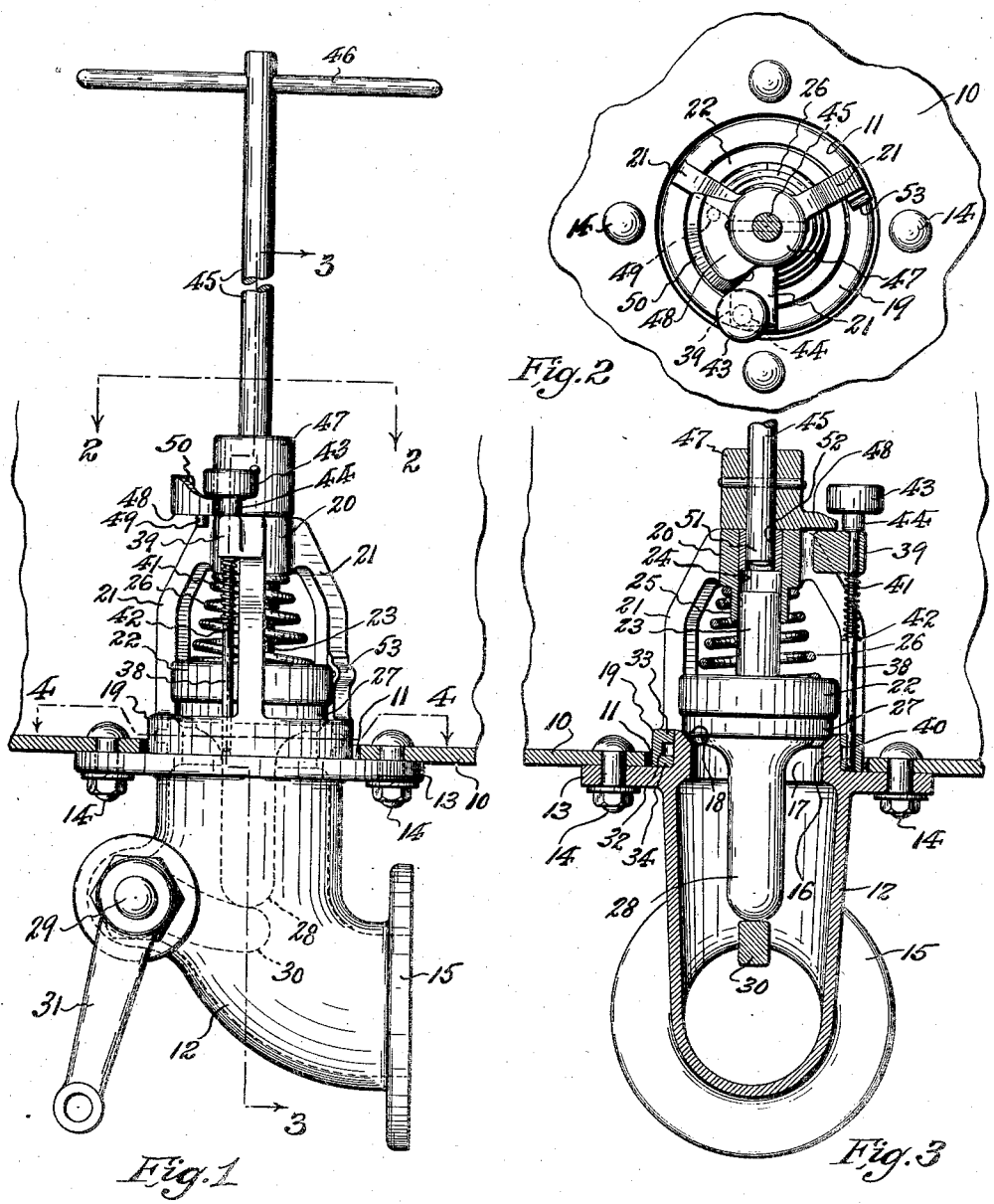

June 27, 1939. W. MEYER ET AL 2,164,039
DETACHABLE VALVE CAGE FOR TANK EMERGENCY VALVES
Filed Sept. 7, 1938 2 Sheets-Sheet 1

INVENTORS,
William Meyer & Howard C. Krone,
BY George D. Richards
ATTORNEY.

June 27, 1939. W. MEYER ET AL 2,164,039
DETACHABLE VALVE CAGE FOR TANK EMERGENCY VALVES
Filed Sept. 7, 1938 2 Sheets-Sheet 2

INVENTORS,
William Meyer & Howard C. Krone,
BY George D. Richards
ATTORNEY.

Patented June 27, 1939

2,164,039

UNITED STATES PATENT OFFICE 2,164,039

DETACHABLE VALVE CAGE FOR TANK EMERGENCY VALVES

William Meyer, East Orange, and Howard C. Krone, Weehawken, N. J., assignor to A. W. Wheaton Brass Works, Inc., Newark, N. J., a corporation of New Jersey Application September 7, 1938, Serial No 228,730

11 Claims. (Cl. 137—21)

This invention relates to improvements in discharge valves for tanks; and the invention has reference, more particularly, to discharge valves of the emergency type, such as are especially adapted for use in connection with the tank compartments of tank wagons and trucks employed in the transportation of petroleum products.

Emergency valves of the kind to which the present invention relates, find one of their most advantageous fields of use in connection with tank compartments of tank wagons and trucks, wherein the same are located at the bottoms of the tank compartments at the points of discharge thereof into the delivery conduits leading therefrom to the faucet valves through which controlled delivery of the tank compartment content is attained. Such emergency valves include a normally closed spring pressed valve member; manipulatable means being provided to open said valve member against the pressure of its closing spring. Ordinarily said emergency valves include an external outlet portion or elbow to couple with a discharge conduit, said portion or elbow being affixed to the tank compartment bottom, and so that the valve member cage connected therewith is disposed and supported within the bottom interior portion of the tank compartment.

It frequently happens that, due to wear or other causes, the valve member requires repair, such for example as replacement of its closing spring or of its valve washer. In such case, either the entire emergency valve must be uncoupled from a delivery conduit and bodily dismounted and withdrawn from normal connected relation to the tank compartment, or the workman must gain access to the interior of the tank compartment through a manhole at the top thereof, so as to reach and repair the tank mechanism from within the tank compartment; both of said methods are laborious and time consuming, and in many cases it is not possible to employ the second mentioned method.

It is an object of this invention to provide a novel emergency valve structure which will simplify the operation of gaining access thereto for repair or replacements, and which will avoid the necessity of uncoupling the same from a conduit served thereby and thereupon bodily removing the same from the tank. To this end the novel emergency valve includes a detachable valve member cage having means for removably coupling the same to the external outlet portion of the valve structure, together with manipulatable means for releasably locking the coupling means against accidental detachment of said valve member cage from said external outlet portion.

This invention has for another object to provide, in an emergency valve structure as above characterized, a novel coupling lock means so constructed and arranged as to be manipulatable by a novel form of cooperating wrench means; which wrench means is insertable into the tank interior through an opened top manhole thereof, so as to engage and release the valve member cage from normal connected relation to the external outlet portion of the valve structure. Said coupling lock means and its cooperating wrench means is also so constructed that the valve member cage is gripped and retained by the wrench means so as to permit withdrawal of the cage upwardly through the tank compartment interior and outwardly through the manhole of the latter, thus delivering the valve member cage and associated parts externally of the tank compartment subject to repair. After a repair has been made, the valve cage and its parts may, in similar manner, be engaged by the wrench means and held thereby for return into the tank compartment interior, subject to manipulation for recoupling and relocking the same with the external outlet portion of the valve structure.

The invention has for a further object to provide a novel releasable detent means for holding the valve member lifted against the pressure of its actuating spring preparatory to and while returning the valve member cage and its parts through the tank compartment interior and into operative coupling and locked relation to the external outlet portion of the valve structure.

An illustrative embodiment of the novel emergency valve structure made according to this invention is shown in the accompanying drawings, in which:—

Figure 4:
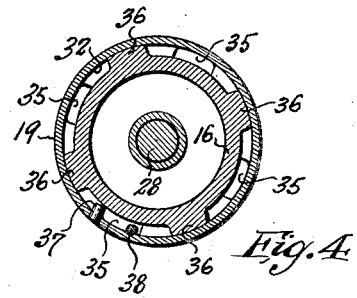
Figure 5:
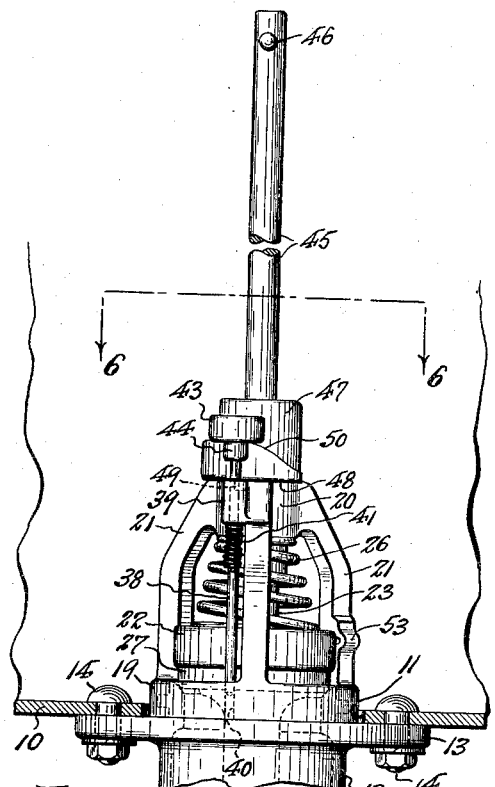
Figure 7:
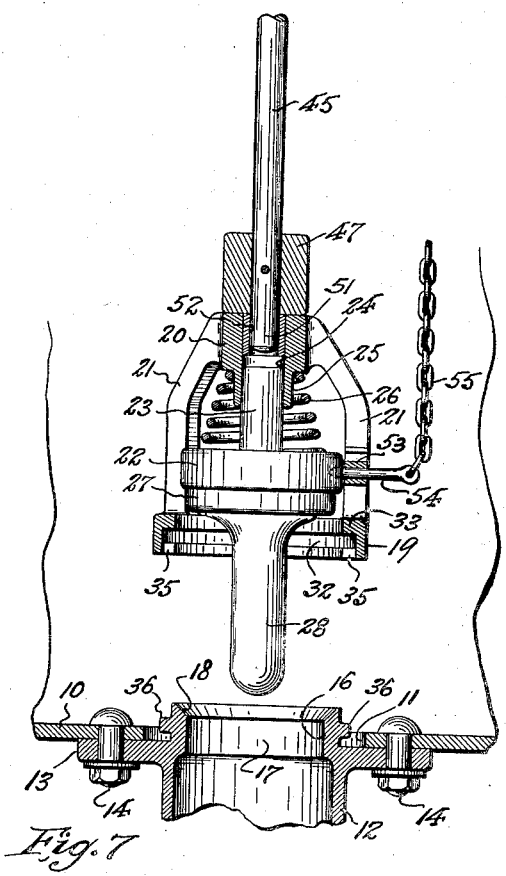
Figure 6:
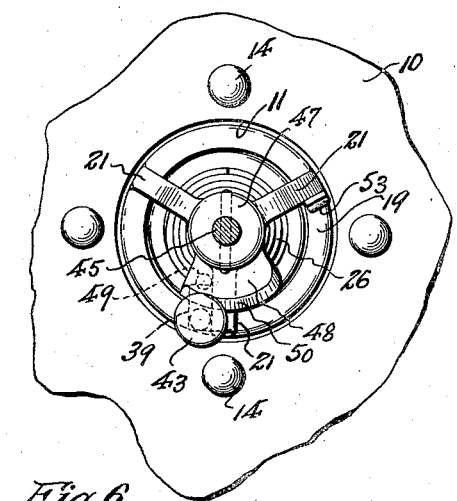

Fig. 1 is a side elevational view of the novel emergency valve as operatively mounted in connection with the bottom of a tank compartment, the latter being broken away. This view also shows the valve member cage manipulating wrench means as applied thereto preparatory to releasing said cage for withdrawal from the tank compartment interior; Fig. 2 is a horizontal section taken on line 2—2 in Fig. 1; Fig. 3 is a vertical longitudinal section taken on line 3—3 in Fig. 1; Fig. 4 is a fragmentary horizontal section taken on line 4—4 in Fig. 1; Fig. 5 is a fragmentary side elevational view similar to that of Fig. 1, but showing the wrench in a position operative to release the coupling lock of the valve member cage, and thereupon hold the latter for withdrawal or replacement; Fig. 6 is a horizontal section taken on line 6—6 in Fig. 5; and Fig. 7 is a fragmentary vertical sectional view showing the valve member cage separated from the external outlet portion of the valve structure, but held by the wrench subject to return thereof into coupled and locked relation to the latter.

Similar characters of references are employed in the hereinabove described views to indicate corresponding parts.

Referring to said drawings, the reference character 10 indicates the bottom of a tank compartment having an opening 11 with which the external outlet portion 12 of the novel emergency valve is registered for communication with the tank compartment interior. Said external outlet portion 12 is shown as of the flanged elbow type, having a flange 13 at its intake end which is bolted to the tank compartment bottom by bolts 14, and having a similar flange 15 at its outlet end to which a correspondingly flanged discharge conduit (not shown) may be bolted. It will be understood however, that the intake end of said external outlet portion 12 could be threaded to screw into the tank compartment bottom opening or its associated fitting, in which case the latter would be correspondingly internally screw threaded. Both methods of affixing emergency valves to tank compartment bottoms are well known to the art. It will also be understood that any well known means of affixing a discharge conduit to the outlet end of the external outlet portion 12 may also be employed.

At its intake end, said external outlet portion 12 is provided with an annular curb portion 16 upstanding above the flange 13 thereof so as to project into the bottom interior of the tank compartment. Said curb portion 16 defines a valve port 17, and formed at the upper internal peripheral part of said curb portion, to surround said valve port 17, is a chamfered valve seat 18. The external part of said curb portion 16 constitutes the male element of coupling means for detachably connecting an internal valve member cage in operative relation to said external outlet portion 12.

The detachable internal valve member cage comprises an annular coupling ring 19 which constitutes the female element of the coupling means by which said internal valve member cage is detachably connected to said external outlet portion 12. Springing upwardly from said coupling ring 19 is an open framework terminating at its upper end in a central bearing portion or hub 20 disposed to axially align itself with the valve port 17 of said external outlet portion 12, when said internal valve member cage is operatively connected with the latter. Said framework may be variously made so long as it provides laterally open spaces to pass the fluid content of the tank compartment to the valve port 17 for outflow therethrough when open. One illustrative form of framework, as shown, comprises spaced legs 21 which extend upwardly from said coupling ring 19 to and convergingly upon said bearing portion or hub 20.

Carried by said valve member cage is a valve member 22 having an axially disposed upwardly projecting stem 23, the upper end of which is slidably supported in the bore 24 of said bearing portion or hub 20 of said cage. Preferably said bearing portion or hub 20 is provided with an extension or neck 25 of reduced diameter dependent therefrom. Engaged and suitably secured to and around said extension or neck 25 is the upper end of a spring member 26, the lower end of which thrustingly engages said valve member 22, being also suitably secured thereto. Suitably mounted and affixed to the underside of said valve member 22 is a valve washer 27 of suitable material or composition. When the valve member cage is operatively coupled to the external outlet portion 12, the spring member 26 yieldably thrusts the valve member 22 downwardly to engage the valve washer 27 with the valve seat 18, thereby normally closing the valve port 17 against the outflow of the liquid content of the tank compartment therethrough. Suitably connected with said valve member 22 to depend axially therefrom into the upper interior of said external outlet portion 12 is a valve member lift stud 28.

Mounted in connection with said external outlet portion 12 is means for lifting said valve member 22 against the tension of the closing spring member 26, said means being operable from a point remote from the emergency valve, as e. g. from the rear end of the tank wagon or truck of which the tank compartment served by the emergency valve is a part, all in a manner known to the art. This valve actuating means ordinarily comprises a rotative spindle 29 suitably journaled in the walls of said external outlet portion 12. Affixed to an inner portion of said spindle 29 is a lift cam 30 adapted to be upswung by rotative movement of the spindle 29, thereby to engage and press upwardly said valve member lift stud 28 with resultant raising of said valve member and consequent opening of the port 17. Affixed to an outer end of said spindle 29 is a lever arm 31 to which may be connected a pull cable (not shown) leading to the remote point from which it is desired that the emergency valve be operated.

The means for detachably coupling the valve member cage in operative relation to the inner end of the external outlet portion 12 comprises the coupling ring 19 of the former which is adapted to be moved telescopically over the annular curb portion 16 of the latter. Formed in the inner circumferential side of said coupling ring 19 is an annular channel 32 defined at its top by an uninterrupted top flange 33 and at its bottom by a bottom flange 34. Said bottom flange is provided with a plurality of circumferentially spaced notches or coupler entrance ways 35. Projecting radially from the exterior face of said curb portion 16 of the external outlet portion 12 are a plurality of correspondingly circumferentially space coupler lugs 36 sized to enter through said coupler entrance ways 35. To couple the valve member cage to the external outlet portion 12, the former is turned to a position wherein the coupler entrance ways 35 are aligned in register with the coupler lugs 36, thus allowing, as the coupling ring 19 is moved down over the curb portion 16, said coupler lugs to enter and align themselves with annular channel 32. Following this the valve member cage is rotated about its vertical axis, thus causing the coupler lugs 36 to be entered in said channel 32 over uninterrupted portions of the bottom flange 34 of said coupling ring 19, thus holding the valve member cage against upward displacement from the resultant operative coupled relation to said external outlet portion 12. In order to assure registration of the coupler entrance ways 35 with the coupled lugs 36, when turning back the valve member cage to a position from which it may be lifted upwardly away from the curb portion 16, said coupling ring 19 is provided with a stop pin 37 which projects into the channel 32 in line with one side of a coupler entrance way 35. When said stop pin 37 is stopped against a side of a coupling lug 36, the several coupler entrance ways will be aligned with the several coupling lugs.

When the valve member cage is applied over the curb portion 16 and turned to the above described coupled relation to the external outlet portion 12, a lock means is provided which, when operative, will project itself downwardly across the channel 32 of the coupling ring 19 within the confines of a coupler entrance way 35. Should the valve member cage of the emergency valve, due to vibration, jars or bouncing of a moving tank wagon or truck equipped therewith, rotatively shift in a direction tending to bring the coupler entrance ways 35 into alignment with the coupling lugs 36, said projected lock means will obstruct and restrain such rotative shift before alignment of the ways 35 and lugs 36 can occur. As a consequence of this, all risk of accidental separation or bouncing off of the valve member cage from the external outlet portion 12, with resultant displacement of the valve member from normal closed relation to the port 17, is eliminated.

An illustrative form of lock means suitable to prevent accidental separation of the valve member cage from the external outlet portion of the valve comprises a vertically movable lock bolt 38. This lock bolt is slidably supported by its upper end portion in a guide bracket 39 which projects outwardly from a leg 21 of the valve member cage, and in somewhat laterally offset relation thereto. The lower end of the lock bolt 38 enters through an opening 40 in the coupling ring 19, so as to cross the channel 32 of the latter within the confines of a coupler entrance way 35. The lock bolt 38 is yieldably projected to the described position by a compression spring 41, which thrusts upon a cross pin 42 carried by the lock bolt; said spring being purchased against the underside of said guide bracket 39. Affixed to the upper end of said lock bolt 38, above the guide bracket 39, is an enlarged retractor head 43, having a neck 44 of reduced diameter which normally abuts the top of said guide bracket 39, thereby not only limiting the downward movement of the lock bolt, but also normally spacing said retractor head 43 somewhat above the top level of the valve member cage hub 20.

The operation of unlocking and then uncoupling the valve member cage relative to the external outlet portion 12 of the valve structure, and vice versa, is accomplished by a cooperative wrench means. This wrench means comprises a handle rod 45 having a transverse handle bar 46 at its upper end portion. Affixed to the lower end portion of said handle rod 45 is a hub member 47 from which extends a wrench arm 48. Projecting from the underside of said wrench arm 48 is a wrench pin or stud 49. The outer extremity of said wrench arm 48 is of curvilinear periphery, and upstanding from the upper side of said wrench arm 48, to extend along the curved periphery of its extremity, is an inclined bolt retractor cam 50. The lower extremity of said handle rod 45 projects downwardly beneath the bottom of said hub member 47, thereby providing a fulcruming stud 51 adapted to be removably engaged in the upper bushed portion 52 of the bore of the bearing portion or hub 20 of said valve member cage. Said handle rod 45 is of a length sufficient to reach downwardly through an open manhole (not shown) of a tank compartment, so as to be passed downwardly through the interior of the latter, and into operative engagement with the valve member cage.

In the use of the wrench means for manipulating the valve cage member to unlock and then uncouple the same from the external outlet portion of the valve structure, the fulcruming stud 51 of the handle rod 45 is inserted in the bushed bore portion 51 at the top of the cage hub 20, so that the handle rod 45 is fulcrumed for rotative movement about its longitudinal axis. As thus operatively applied the wrench means assumes an initial position relative to the cage, such as shown in Fig. 1. Upon turning the thus applied wrench means in an anti-clockwise direction, the wrench arm 48 is swung so as to pass and move its bolt retractor cam 50 beneath the shoulder formed by the underside of the bolt head 43, whereby the cam exerts a lifting force upon the lock bolt 38, so as to withdraw the lower end of the latter upwardly out of the channel 32 of the cage coupling ring 19, thus freeing the cage for rotative movement relative to the curb portion 16 of the external outlet portion of the valve structure. By the time the lock bolt 38 is thus retracted, the rotative movement of the wrench arm 48 brings its wrench stud 49 against the side of a framework leg 21, whereupon the rotative movement of the wrench means is imparted to the cage as a whole so as to turn the latter to bring the coupling entrance ways 35 of its coupling ring 19 into registered alignment with the coupling lugs 36 of the external outlet portion; this occurring when such rotative movement is arrested by the abutment of the stop pin 37 against the side of a coupling lug 36. By the time this occurs the flat top of the bolt retractor cam 50 has engaged the underside of the bolt head 43 (see Figs. 5 and 6), thus interlocking the wrench means and cage together, so that a straight upward pull upon the handle rod 45 will not only lift the cage away from the external outlet portion of the valve structure, but will also retain the cage so that it may be withdrawn upwardly through the tank compartment and outwardly therefrom, and thus delivered into the hands of the workman for the carrying out of such repairs thereto as are necessary to be made.

After repairs have been made to the valve member structure carried by the cage, and it is desired to return the cage to operative assembled relation to the external outlet portion of the valve structure, it is desirable to first set and hold the valve member 22 in a lifted position against the tension of the spring 26, since, with the valve member so lifted, it is easier to reengage the coupling ring and its coupling elements with said external outlet portion. To this end releasable means are provided for holding the valve member 22 in check. This means comprises a transversely perforate bearing boss 53 provided in connection with a leg 21 of the cage. Through this bearing boss 53 is removably engaged a check pin 54, the end of which is thrust into an exteriorly open socket in the side of the valve member 22 when the latter is lifted (see Figs. 5 and 6), thus serving to retain the same in the desired lifted position. Connected with the outer end of said check pin 54 is a chain or other flexible connection 55, which will extend exteriorly of the tank compartment.

To return the cage to coupled relation to the external outlet portion, the same is engaged so as to be held by the wrench means with its lock bolt 38 retracted, as shown in Fig. 7, whereupon the cage is lowered into the tank compartment, its coupling ring 19 slid downwardly over the curb portion 16 so as to enter the coupling lugs 36 of the latter in the channel 32 of the former, and is then turned clockwise to carry said coupling lugs 36 into the channel 32, thereby to couple the cage to said external outlet portion. When thus coupled, continued rotation of the wrench means will withdraw the retractor cam 50 from the bolt head 43, thus allowing the bolt to be projected downwardly to locking position, whereafter the wrench means is detached from the cage and withdrawn, thus leaving the cage not only properly coupled to but locked against accidental separation from the external outlet portion of the valve structure.

After the cage is thus replaced, the operator by pulling on the chain 55, dislodges the check pin 54, so that the valve member 22 thereupon moves, under the pressure of its spring to normal seated relation closing the valve port 17.

It will be obvious that many changes could be made in the above described constructions and many apparently widely different embodiments of this invention could be made without departing from the scope thereof. It is therefore intended that all matter contained in the above description or shown in the accompanying drawings shall be interpreted as illustrative and not in a limiting sense.

We claim:

1. In an emergency valve for a tank chamber outlet, a fixed external outlet portion having a port, said outlet portion having coupling means within said tank chamber, a detachable valve member cage provided with a valve means for closing said port, said cage having coupling means cooperative with said outlet portion coupling means, and releasable lock means carried by said cage, said lock means being movable to positively interlock said outlet portion and cage against accidental separation when the same are joined together by their cooperating coupling means.

2. In an emergency valve for a tank chamber outlet, a fixed external outlet portion having a port, said outlet portion having coupling means within said tank chamber, a detachable valve member cage provided with a valve means for closing said port, said cage having coupling means cooperative with said outlet portion coupling means, releasable lock means carried by said cage operative to lock said coupling means when operatively engaged against disconnection, and wrench means applicable to said cage and operative to release said lock means and then uncouple said cage from said external outlet portion.

3. In an emergency valve for a tank chamber outlet, a fixed external outlet portion having a port and surrounding valve seat, said outlet portion having male coupling means disposed within the tank chamber, a detachable valve member cage having a spring urged valve means for closing said port, said outlet portion having means actuatable to open said valve means, said cage having female coupling means cooperative with said male coupling means, and releasable lock means carried by said cage operative to lock said male and female coupling means when engaged against disconnection.

4. In an emergency valve for a tank chamber outlet, a fixed external outlet portion having a port and surrounding valve seat, said outlet portion having male coupling means disposed within the tank chamber, a detachable valve member cage having a spring urge valve means for closing said port, said outlet portion having means actuatable to open said valve means, said cage having female coupling means cooperative with said male coupling means, releasable lock means carried by said cage operative to lock said male and female coupling means when engaged against disconnection, and wrench means applicable to said cage and operative to release said lock means and then uncouple and lift away said cage and its valve from said external outlet portion.

5. In an emergency valve for a tank chamber outlet, a fixed external outlet portion having a port and surrounding valve seat, said outlet portion having male coupling means disposed within the tank chamber, a detachable valve member cage having a spring urged valve means for closing said port, said outlet portion having means actuable to open said valve means, said cage having an internally channeled coupling ring provided with coupling entrance ways for the passage of said male coupling means into engagement with the channel thereof, and a releasable lock bolt projectible across the channel of said coupling ring to prevent separation of the engaged male coupling means therefrom.

6. In an emergency valve for a tank chamber outlet, a fixed external outlet portion having a port and surrounding valve seat, said outlet portion having male coupling means disposed within the tank chamber, a detachable valve member cage having a spring urged valve means for closing said port, said outlet portion having means actuable to open said valve means, said cage having an internally channeled coupling ring provided with coupling entrance ways for the passage of said male coupling means into engagement with the channel thereof, a releasable lock bolt projectile across the channel of said coupling ring to prevent separation of the engaged male coupling means therefrom, and wrench means applicable to said cage for cooperation with the same and its lock bolt and operative to first release the latter and then uncouple and lift away said cage and its valve means from said external outlet portion.

7. In an emergency valve for a tank chamber outlet, a fixed external outlet portion having a port and surrounding valve seat, said outlet portion having male coupling means disposed within the tank chamber, a detachable valve member cage having a spring urged valve means for closing said port, said outlet portion having means actuable to open said valve means, said cage having an internally channeled coupling ring provided with coupling entrance ways for the passage of said male coupling means into engagement with the channel thereof, a releaseable lock bolt projectible across the channel of said coupling ring to prevent separation of the engaged male coupling means therefrom, wrench means applicable to said cage for cooperation with the same and its lock bolt and operative to first release the latter and then uncouple and lift away said cage and its valve means from said external outlet portion, means for rotatively engaging said wrench means with said cage, said lock bolt having a retractor head, said wrench means having a lift cam portion to engage and lift said head to release said lock bolt, and said wrench means having means to engage and impart rotary motion to said cage after said lock bolt is released.

8. An emergency valve for a tank chamber outlet as defined in claim 3, including a detachable detent means for holding the valve member carried by the cage in uplifted position against its closing spring preparatory to moving said cage into operative coupled relation to said external outlet portion.

9. An emergency valve for a tank chamber outlet as defined in claim 5, including a detachable detent means for holding the valve member carried by the cage in uplifted position against its closing spring preparatory to moving said cage into operative coupled relation to said external outlet portion.

10. An emergency valve for a tank chamber outlet as defined in claim 6, including a detachable detent means for holding the valve member carried by the cage in uplifted position against its closing spring preparatory to moving said cage into operative coupled relation to said external outlet portion.

11. An emergency valve for a tank chamber outlet as defined in claim 7, including a detachable detent means for holding the valve member carried by the cage in uplifted position against its closing spring preparatory to moving said cage into operative coupled relation to said external outlet portion.

WILLIAM MEYER.
HOWARD C. KRONE.